Patented Nov. 21, 1933

1,936,231

UNITED STATES PATENT OFFICE 1,936,231

GLASS

Frederick Gelstharp, Tarentum, and James H. Sherts, Brackenridge, Pa., assignors to Pittsburgh Plate Glass Company, a corporation of Pennsylvania No Drawing. Application September 27, 1932
Serial No. 635,044

4 Claims. (Cl. 106—36.1)

The invention relates to glass of the so-called absorption type having its principal fields of use in safety glass, automobile windshields and goggles, although capable of use in any field in which plate or window glass is used. The object of the invention is the provision of glass which will function as absorption glass for the purposes for which it is designed, but which can be produced at the same cost as ordinary plate or window glass, which has the same qualities of strength, hardness and light transmitting properties as ordinary plate or window glass, and which can be used interchangeably with ordinary plate and window glass, thus permitting the use of one tank in the production of glass for all purposes.

Heretofore, absorption glasses of merit have required special batches of relatively high cost, or have required special heat treatments, and their use has been confined largely to optical purposes. Safety glass, which is usually made of two sheets of glass with an interposed sheet of celluloid requires absorption glass in order to protect the celluloid from deterioration, as pointed out in the Edwards Patent No. 1,467,030, but this requirement has never been met commercially, due to the high cost of the colorless absorption glass which has been available, and to the poor light transmitting qualities of the cheaper absorption glasses. The present invention finds its largest field of use in this connection, since it affords the necessary protection to the celluloid due to its absorption properties, and at the same time approaches, in its preferred form, the high, visible light transmitting qualities of ordinary plate glass at no higher cost.

The ultra-violet cut-off agent employed is iron oxide, preferably in the form of rouge ($Fe_2O_3$), which is added to a regulation plate glass batch in quantities so small that the glass produced retains its visible light transmitting properties, and its substantially colorless appearance, while at the same time giving a cut-off of all but a very small percentage of the ultra-violet rays whose wave length is short enough to cause deterioration of the celluloid, and also giving a cut-off of a substantial portion of the infra red rays which tend to produce eye fatigue. Heretofore, iron compounds as used in glass, such as those pointed out in the Edwards patent, and by Sir William Crookes in his monograph "The Preparation of Eye Preserving Glass for Spectacles", published in 1914 by Harrison and Sons of London, have either been employed in conjunction with other violet ray cut-off agents, such as the cerium compounds, or have been used in such quantity as to produce strongly colored glasses with low visible light transmitting qualities, and with batches which are unsuitable (from the standpoint of cost and quality) for safety glass production or for glazing purposes. A variety of batches may be employed, the one below having been found very satisfactory.

| Batch | | Glass analysis | |
|---|---|---|---|
| Sand | 1000 | $SiO_2$ | 71.99 |
| Soda ash | 282 | $Na_2O$ | 13.43 |
| Limestone | 330 | CaO | 12.99 |
| Saltcake | 67 | MgO | .06 |
| Coal | 3 | $Na_2SO_4$ | .88 |
| Rouge | 4.2 | NaCl | .08 |
| | | $Al_2O_3$ | .22 |
| | | $Fe_2O_3$ | .35 |
| | | | 100.00 |

The batch given above is a typical lime soda batch for making plate glass, aside from the addition of the rouge, which together with the small iron content, which may be present in the sand and limestone as impurities, brings the iron oxide content up to the .35 figure given in the glass analysis. The glass thus produced has the quality of plate glass, and is comparable as to visible light transmitting properties, which will run about 90 per cent through a plate 2 millimeters in thickness in both cases. This is within 1 or 2 per cent of the visible light transmission of ordinary plate glass. Ordinary plate glass when viewed from the edges shows a green color, but when viewed flatwise in thin sheets may be aptly described as "colorless". This description will also apply to the improved glass, although viewed from the edge, it is distinctly darker than the ordinary glass. This absence of noticeable color permits the improved glass to be used in mirrors or for glazing where ordinary plate or window glass is used, and permits it to be used interchangeably with ordinary glass. The cost of the glass is no greater than plate glass, as the small quantity of the rouge required and its cheapness renders it negligible as a cost item, particularly as it permits the use of a slightly smaller quantity of soda ash than would otherwise be used in a plate glass batch due to the fluxing action of the rouge.

The particular glass given above with a section 2.9 millimeters in thickness screens out all the ultra-violet rays having a wave length of 313 millimicrons or less, and permits the passage of only about 8.0 per cent of those rays having a wave length of 334 millimicrons. Only the rays having a wave length of 334 millimicrons or less have any material decomposing effect upon celluloid so that the use of the improved glass in safety glass gives all the protection which is necessary from a practical standpoint. While the content of .35 per cent of iron oxide has been found most satisfactory, the figure may be increased or decreased somewhat. Below 0.2 per cent, the protection afforded is hardly sufficient, and above 1.0 per cent, the visible light transmission is reduced below 85 per cent and the quality of the glass is seriously impaired in the continuous tank process by which the glass is preferably produced.

In addition to acting as a cut-off or screen for the most damaging ultra-violet rays, the glass also functions to screen certain red rays which cause eye-strain or fatigue. Accordingly this glass possesses a distinct advantage for this reason in use in windshields, goggles and the like.

It will be understood that various iron compounds other than rouge may be employed in order to get the iron oxide into the glass. Also that the iron oxide in the finished glass is not necessarily $Fe_2O_3$. The iron content in the glass is determined by the usual process of analysis and the figure of .35 is arrived at by calculation based on the assumption that all of the iron present in the glass is there as a constituent of $Fe_2O_3$. It will thus be understood that the claims are drawn on this basis, and that the figures as to the amount of iron oxide refer to iron oxide translated into terms of $Fe_2O_3$.

What we claim is:

1. A clear glass having a total visible incident light transmission through a sheet of 2 millimeters thickness of about 85 to 90 per cent, containing from .20 to 1.0 per cent of iron as its sole colorizing oxide, said glass exhibiting a dark green color when viewed edgewise.

2. A clear glass having a total visible incident light transmission through a sheet of 2 millimeters thickness of upwards of 84 per cent, containing .20 to 1.0 per cent of iron oxide, said glass in a sheet of the thickness specified exhibiting a greenish tint when viewed flatwise and a dark green color when viewed edgewise.

3. A clear glass having a total visible light transmission through a sheet of 2 millimeters thickness of about 85 to 90 per cent containing from .20 to 1.0 per cent of iron oxide, said glass in a sheet of the thickness specified exhibiting a slight green tint when viewed flatwise and a dark green color when viewed edgewise.

4. A clear glass having a total visible incident light transmission through a sheet of 2 millimeters thickness of approximately 90 per cent, containing about .25 to .50 per cent of iron oxide as its sole colorizing oxide, said glass exhibiting a dark green color when viewed edgewise.

FREDERICK GELSTHARP.
JAMES H. SHERTS.